United States Patent [19]

Plummer

[11] Patent Number: 5,180,572

[45] Date of Patent: Jan. 19, 1993

[54] CONVERSION OF HYDROGEN SULFIDE TO SULFUR AND HYDROGEN

[75] Inventor: Mark A. Plummer, Littleton, Colo.

[73] Assignee: Marathon Oil Company, Findlay, Ohio

[21] Appl. No.: 795,408

[22] Filed: Nov. 19, 1991

[51] Int. Cl.$^5$ .......................... C01B 17/05; C01B 3/22
[52] U.S. Cl. .................. 423/576.7; 423/573.1; 423/648.1; 423/224
[58] Field of Search ............... 423/576.7, 648.1, 658.2, 423/573.1, 224, 226

[56] References Cited

U.S. PATENT DOCUMENTS

| | | | |
|---|---|---|---|
| 3,035,889 | 5/1962 | Nicklin et al. | 423/576.7 |
| 3,087,793 | 4/1963 | Hay | 23/225 |
| 3,725,537 | 4/1973 | Schulze et al. | 423/222 |
| 3,914,399 | 10/1975 | Beazley | 423/573 |
| 3,923,966 | 12/1975 | Vaughan | 423/573 |
| 3,937,795 | 2/1976 | Hasebe | 423/226 |
| 4,581,128 | 4/1986 | Plummer et al. | 208/208 R |
| 4,592,905 | 6/1986 | Plummer et al. | 423/573 R |

OTHER PUBLICATIONS

Plummer, M. A. "Sulfur and Hydrogen from H$_2$S", Hydrocarbon Processing, Int. Ed., vol. 66, #4 (Apr. 1987), pp. 38-40.

*Primary Examiner*—Gary P. Straub
*Assistant Examiner*—Peter T. DiMauro
*Attorney, Agent, or Firm*—Jack L. Hummel; Jack E. Ebel

[57] ABSTRACT

The invention relates to a process for converting hydrogen sulfide to sulfur and hydrogen. The hydrogen sulfide gas is contacted with a quinone in an aqueous solvent containing a sulfur complexing agent to yield sulfur and the corresponding hydroquinone. The hydroquinone is converted back to quinone and hydrogen. The quinone is recycled and the hydrogen gas and sulfur is collected. The invention also discloses a range of ratios of complexing agent to quinone which produces an unexpected yield for the disclosed reaction.

17 Claims, 1 Drawing Sheet

TERMINOLOGY

ADS= 2,7 SODIUM ANTHRAQUINONE DISULFONATE
H₂ADS- 2,7 SODIUM ANTHRAHYDROQUINONE DISULFONATE
COMPLEXING AGENT NBA= n-BUTYAMINE

CONVERSION CONDITIONS

TEMPERATURE: 95°F TO 140°F
H₂S PRESSURE: 12.5 PSIA
ADS IN WATER SOLVENT: 12 TO 35 WT%
TIME: 1 TO 2 HOURS
GOOD MIXING DURING S₈ FORMATION

ADS CONVERSION TO H₂ADS VS. MOLAR RATIO OF NBA/ADS

CONVERSION OF HYDROGEN SULFIDE TO SULFUR AND HYDROGEN

BACKGROUND OF INVENTION

1. Field of The Invention

The invention relates to a process for converting hydrogen sulfide into sulfur and hydrogen. More specifically, hydrogen sulfide gas is reacted with a quinone dissolved in an aqueous solvent containing a sulfur complexing agent, yielding sulfur and the corresponding hydroquinone which is then converted back to the quinone while releasing hydrogen gas.

2. Description of Related Art

Many processes related to the petroleum industry generate gaseous by-products containing hydrogen sulfide, by itself or in a mixture with other gases, such as carbon dioxide. U.S. Pat. No. 4,581,128 to Plummer and Zimmerman discloses a process for desulfurizing a hydrocarbon feedstock having a relatively high sulfur content by contacting the feedstock with hydrogen gas in the presence of a catalyst to obtain a hydrocarbon product having a relatively low sulfur content. The hydrogen sulfide gas by-product produced therewith is treated with a quinone dissolved in a polar organic solvent to obtain a sulfur product and a hydroquinone. The hydroquinone is regenerated by contacting it with air in the presence of a catalyst. The resulting quinone is recycled back to the absorption reaction while hydrogen peroxide produced as a by-product is reduced to oxygen and water. The oxygen is used to partially oxidize a hydrocarbon fuel which generates hydrogen gas and hydrogen gas is recycled to the initial desulfurization step. U.S. Pat. No. 4,592,905 to Plummer and Beazley discloses a process for contacting and reacting hydrogen sulfide gas with an anthraquinone dissolved in a polar organic solvent to yield sulfur and the corresponding anthrahydroquinone. Sulfur precipitates from the solution and is recovered as a product. The remaining anthrahydroquinone solution is fed to a dehydrogenation reactor where it is thermally or catalytically regenerated to produce the initial anthraquinone form in solution and hydrogen gas. The anthraquinone solution is recycled back to the hydrogen reactor and the hydrogen is recovered as a product. U.S. Pat. No. 3,913,966 to Vaughan discloses a process for reacting hydrogen sulfide with an anthraquinone in an organic solvent in the presence of an organic base catalyst to produce elemental sulfur and an anthrahydroquinone. The sulfur is recovered and the anthrahydroquinone is oxidized to yield the starting anthraquinone and hydrogen peroxide.

The above cited patents require the use of polar organic solvents. Polar organic solvents generally require that health, safety and environmental protection precautions be taken to prevent harm to personnel or to the environment. Therefore a need exists for a process to convert hydrogen sulfide gas to sulfur via a quinone system which does not utilize polar organic solvents thus eliminating potential problems associated with the use of such solvents.

It is therefore an object of this invention to provide a process for the conversion of hydrogen sulfide gas to sulfur and hydrogen gas which uses an aqueous solvent rather than a polar organic solvent.

SUMMARY OF THE INVENTION

The present invention is a process for converting hydrogen sulfide gas ($H_2S$) to sulfur (S) and hydrogen gas ($H_2$). The process is comprised of the steps of: a) contacting hydrogen sulfide gas with a quinone dissolved in an aqueous solvent containing a complexing agent; b) reacting the hydrogen sulfide gas with the quinone and the complexing agent to produce sulfur and a hydroquinone dissolved in the aqueous solvent and complexing agent; c) separating the sulfur from the aqueous solvent and complexing agent; d) dehydrogenating the hydroquinone to produce hydrogen gas and to regenerate the quinone in the aqueous solvent and complexing agent; and e) recycling the quinone, complexing agent and aqueous solvent to step a). The complexing agent is present in the solution from about 1 mole of complexing agent to about 4 moles of quinone to about 1 mole of complexing agent to about 32 moles of quinone.

The aqueous process of the present invention converts hydrogen sulfide gas to sulfur and hydrogen without the personnel and environmental problems normally associated with organic solvents. A specific range of ratios of complexing agent to quinone produces an unexpected sulfur yield.

BRIEF DESCRIPTION OF THE DRAWING

The accompanying drawing, which is incorporated in and forms a part of the specification, illustrates the embodiments of the present invention and, together with the description, serves to explain the principles of the invention.

DESCRIPTION OF THE PREFERRED EMBODIMENTS

Figure 1:
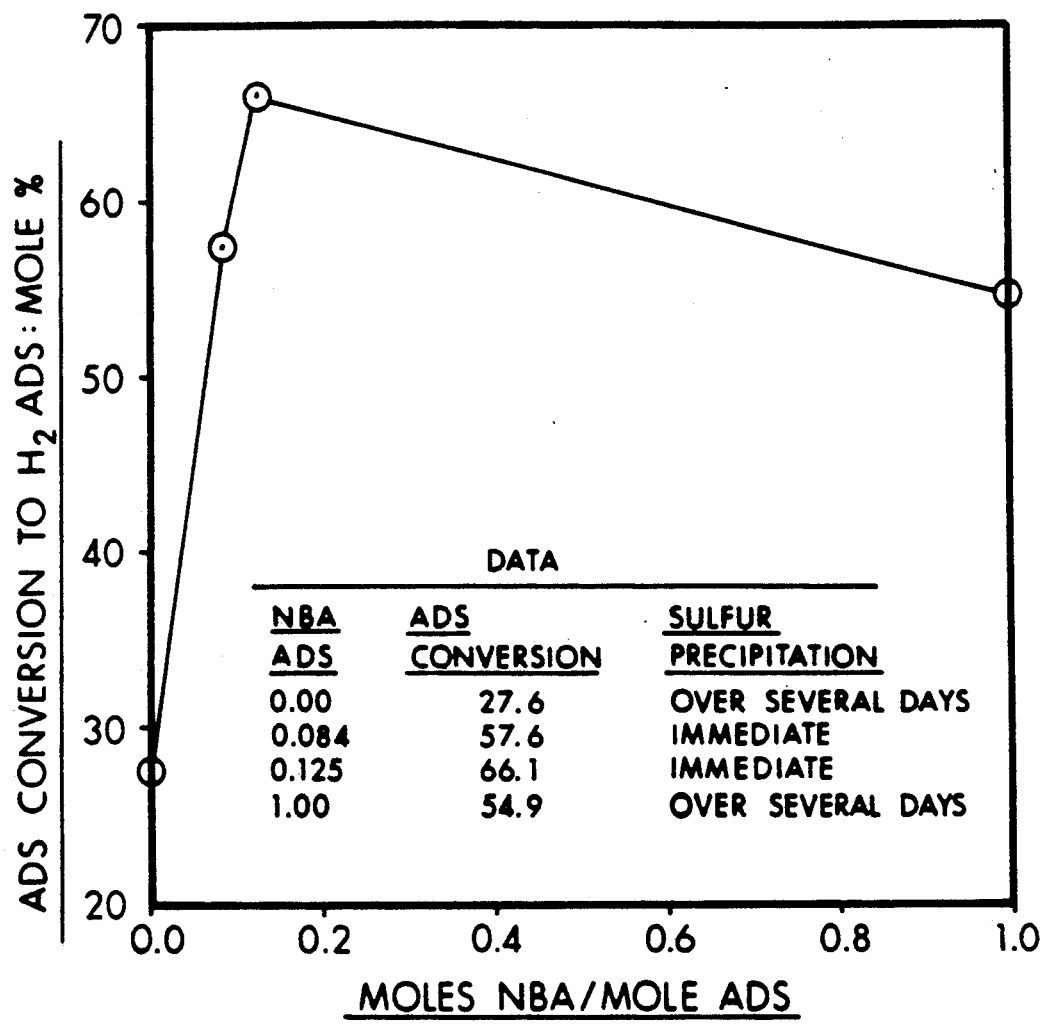
FIG. 1 is a graph of the mole percent conversion of 2,7-sodium anthraquinone disulfonate to 2,7-sodium anthrahydroquinone disulfonate versus the molar ratio of n-butylamine complexing agent to 2,7-sodium anthraquinone disulfonate.

According to the present invention, a feed gas containing hydrogen sulfide ($H_2S$), is contacted in a $H_2S$ reactor with an aqueous solvent which contains a water soluble quinone and a sulfur complexing agent such as t-butylamine. Upon contact, the solvent preferentially solubilizes only the $H_2S$ portion of the feed gas, although the solvent may also solubilize small amounts of carbon dioxide ($CO_2$) or other unreactive materials, if they are present in the feed gas. This solution is referred to as the "reaction solution" herein. The reaction solution is maintained in the reactor at a temperature from about 35° C. to about 98° C. and at an $H_2S$ partial pressure from about 5 kPa to about 1000 kPa for a time sufficient to convert the $H_2S$ and quinone to sulfur and hydroquinone. This is generally from about 5 minutes to about 120 minutes. The quinone concentration in the reaction solution is not critical, although a higher concentration favors an increased reaction rate, which is preferred. The upper concentration limit of quinone is the saturation point of quinone in the aqueous solvent at the reaction temperature. A typical water soluble quinone is 2,7-sodium anthraquinone disulfonate. The insoluble sulfur, e.g., $S_8$ or other forms of polymerized sulfur, is withdrawn from the reactor as a precipitate in the reaction solution. The sulfur is separated from the solution by filtration, centrifugation, or other means known in the art. It is then dried or melted to a liquid form. After removal of the sulfur product, the solution is withdrawn from the H₂S reactor containing hydroquinone, solvent, complexing agent and any unreacted compounds from the feed gas. This solution is heated to remove any unreacted compounds and fed to a dehydrogenation reactor. Dehydrogenation produces hydrogen gas ($H_2$) as a product and quinone which is recycled to the $H_2S$ reactor. Dehydrogenation can be by electrochemical, thermal or by any other dehydrogenation technique obvious to one skilled in the art.

Although the mechanism by which the $H_2S$ is converted to sulfur is not entirely understood, it is believed that three chemical steps occur. $H_2S$ first reacts with the complexing agent to form a quaternary ion complex. In the second step the complex reacts with the quinone to yield elemental sulfur (S) and the corresponding hydroquinone. The third step is a sulfur polymerization reaction which polymerizes elemental sulfur (S) to polymerized sulfur ($S_8$). The polymerized sulfur then precipitates out of solution.

Primary parameters controlling both the $H_2S$-quinone reaction and the sulfur polymerization steps are the choice of the quinone, which must be soluble in an aqueous solvent, as well as the process temperature and pressure. Choice of the quinone is based on such properties as the solubility of quinone in the aqueous solvent and the electronegativity of the quinone. Solubility is a function of the groups substituted on the quinone. For example, sulfonated quinones have much higher solubilites than alkyl quinones. Likewise, electronegativity is a function of the quinone substituents. Useful quinones are the mono and disodium sulfonate salts of anthraquinones and napthaquinones. Optimization of the process requires balancing competing factors. For example, each step of the $H_2S$-quinone reaction optimally proceeds within a different temperature range. Quaternary ion complex formation is favored at lower temperatures and quinone to hydroquinone conversion is favored at high temperatures. An optimal temperature generally compromises these two factors. With respect to pressure, increased $H_2S$ partial pressure increases both quaternary ion complex formation and desirably higher quinone conversion. However, a large quaternary ion complex concentration undesirably increases the sulfur polymerization time. The physical properties of the water used as an aqueous solvent does not appear to effect the process of the present invention. Therefore, ordinary tap water or distilled water can be used to practice this invention.

Selection of a complexing agent is based on the agent's ability to form the quaternary ion complex. Useful complexing agents are amines, amides and ureas. Examples of complexing agents are n,butylamine, diethylamine, diethylmethylamine, pyridine, piperidine, N,N-dimethylformamide, N,N-dimethylacetamide, 1-methyl-2-pyrrolidone, 1,2-dimethylurea, and 1,1,2,2 tetramethylurea.

However, the ratio of complexing agent to quinone is crucial to the rates of the $H_2S$ quinone reaction and the sulfur polymerization reaction. The range of molar ratios of complexing agent to quinone is about 1:4 to about 1:32, preferably about 1:6 to about 1:16 and most preferably about 1:8. The effect of this ratio is illustrated in the following examples. Preferred embodiments of the invention are set forth below by example but are not to be construed as limiting the scope of the invention.

EXAMPLE

Hydrogen sulfide is reacted with 2,7-sodium anthraquinone disulfonate dissolved in an aqueous solution containing t-butylamine as a complexing agent. The reaction conditions and results are shown below and represented graphically in FIG. 1.

| Wt % Quinone in Water | Moles t-butylamine per Mole Quinone | Reaction Conditions | | Wt % Quinone Conversion and $S_8$ Recovery |
|---|---|---|---|---|
| | | Temp (°F.) | Time (hr) | |
| 35 | None | 95–100 | 1.0 | 27.6 |
| 30 | 1:12 | 100–140 | 1.5 | 57.6 |
| 15 | 1:8 | 100–140 | 1.5 | 66.1 |
| 11.7 | 1:1 | 95–104 | 2.0 | 54.9 |

As can be seen from the above example and FIG. 1, the molar ratio of 1 mole of complexing agent to 8 moles of quinone yields an unexpectedly high conversion of quinone to hydroquinone and polymerized sulfur.

While the foregoing preferred embodiments of the invention have been described and shown, it is understood that all alternatives and modifications, such as those suggested and others may be made thereto and fall within the scope of the invention.

I claim:

1. A process for converting hydrogen sulfide gas to sulfur and hydrogen gas comprising the steps of:
    a) contacting said hydrogen sulfide gas with a water-soluble quinone which is dissolved in an aqueous solvent containing a complexing agent, said aqueous solvent consisting essentially of water, said complexing agent selected from the group consisting of amines, amides, ureas, and mixtures thereof being present in said aqueous solvent in a range of about 1 mole of said complexing agent to about 4 moles of said quinone to about 1 mole of said complexing agent to about 32 moles of said quinone and reacting with said hydrogen sulfide to form a quaternary ion complex:
    b) reacting said hydrogen sulfide gas with said quinone to produce sulfur and a hydroquinone dissolved in said aqueous solvent containing said complexing agent;
    c) separating said sulfur from said aqueous solvent and said complexing agent;
    d) dehydrogenating said hydroquinone dissolved in said aqueous solvent containing said complexing agent to produce hydrogen gas and to regenerate said quinone dissolved in said aqueous solvent and said complexing agent; and
    e) recycling said quinone in said aqueous solvent and complexing agent to step a).

2. The process of claim 1 wherein said complexing agent is an amine.

3. The process of claim 1 wherein said complexing agent is an amide.

4. The process of claim 1 wherein said complexing agent is a urea.

5. The process of claim 2 wherein said complexing agent is n-butylamine, diethylamine, diethylmethylamine, pyridine or piperidine.

6. The process of claim 3 wherein said complexing agent is N,N-dimethylformamide, N,N-dimethylacetamide or 1-methyl-2-pyrrolidone.

7. The process of claim 4 wherein said complexing agent is 1,2-dimethylurea or 1,1,2,2-tetramethylurea.

8. The process of claim 1 wherein said complexing agent is present in said aqueou solvent in a range of about 1 mole of said complexing agent to about 6 moles of said quinone to about 1 mole of said complexing agent to about 16 moles of said quinone.

9. The process of claim 8 wherein said complexing agent is present in said aqueous solvent in a ratio of of about 1 mole of said complexing agent to about 8 moles of said quinone.

10. The process of claim 1 wherein the reaction of step b) is reacted at a temperature of from about 35° C. to about 98° C.

11. The process of claim 1 wherein the reaction of step b) is reacted at an $H_2S$ partial pressure of from 5 kPa to about 1000 kPa.

12. The process of claim 1 wherein the reaction of step b) is reacted for about 5 minutes to about 120 minutes.

13. The process of claim 1 wherein said quinone is an anthraquinone or a naphthaquinone.

14. The process of claim 13 wherein said anthraquinone is a monosodium sulfonate salt of an anthraquinone.

15. The process of claim 13 wherein said anthraquinone is a disodium sulfonate salt of an anthraquinone.

16. The process of claim 13 wherein said anthraquinone is 2,7-sodium anthraquinone disulfonate.

17. The process of claim 1 wherein said aqueous solvent is tap water or distilled water.

* * * * *

UNITED STATES PATENT AND TRADEMARK OFFICE
CERTIFICATE OF CORRECTION

PATENT NO. : 5,180,572

DATED : January 19, 1993

INVENTOR(S) : Mark A. Plummer

It is certified that error appears in the above-identified patent and that said Letters Patent is hereby corrected as shown below:

Col. 3, line 54: Delete "n" before butylamine and insert --N--
Col. 5, line 5: Delete "aqueou" and insert --aqueous--

Signed and Sealed this

Fourteenth Day of December, 1993

Attest:

BRUCE LEHMAN

Attesting Officer     Commissioner of Patents and Trademarks